United States Patent [19]

Kawai et al.

[11] Patent Number: 4,869,871

[45] Date of Patent: Sep. 26, 1989

[54] PB-SN-SB-IN SOLDER ALLOY

[75] Inventors: Kenichi Kawai; Nobuo Fukuma; Akira Matsui; Kenichiro Futamura; Eizi Asada; Tatsuhiko Fukuoka, all of Toyota, Japan

[73] Assignees: Toyota Motor Corporation, Toyota; Taiho Kogyo Co., Ltd., Aichi, both of Japan

[21] Appl. No.: 324,117

[22] Filed: Mar. 16, 1989

[30] Foreign Application Priority Data

Mar. 17, 1988 [JP] Japan ................... 63-61919

[51] Int. Cl.$^4$ ............ C22C 11/06; C22C 13/00; C22C 30/02; C22C 30/04
[52] U.S. Cl. .................. 420/559; 420/566; 420/571; 420/587; 420/589
[58] Field of Search ............ 420/559, 561, 566, 571, 420/587, 589

[56] References Cited

U.S. PATENT DOCUMENTS

| | | | |
|---|---|---|---|
| 2,210,593 | 8/1940 | McCullough | 420/559 |
| 3,607,252 | 9/1971 | North | 420/559 |
| 3,945,556 | 3/1976 | Manko | 420/559 |

FOREIGN PATENT DOCUMENTS

| | | | |
|---|---|---|---|
| 40-25885 | 11/1965 | Japan . | |
| 45-2093 | 1/1970 | Japan . | |
| 52-30377 | 8/1977 | Japan . | |
| 18505 | 2/1980 | Japan | 420/559 |
| 56-144893 | 11/1981 | Japan . | |
| 56-165588 | 12/1981 | Japan . | |
| 57-75299 | 5/1982 | Japan . | |
| 59-70490 | 4/1984 | Japan . | |
| 222140 | 10/1986 | Japan | 420/559 |
| 612767 | 6/1978 | U.S.S.R. | 420/571 |

OTHER PUBLICATIONS

*Soldering Manual*, American Welding Society, 1959, pp. 21–23.

Primary Examiner—Robert McDowell

[57] ABSTRACT

Soldering material essentially consists of 20–50% of Pb, 0.5–less than 1% of Sb, 0.1–5% of In, and balance of Sn. Such material is suitable to solder electronic parts exposed to temperature variation and mechanical vibration.

7 Claims, 4 Drawing Sheets

PB-SN-SB-IN SOLDER ALLOY

BACKGROUND OF THE INVENTION

1. Field of The Invention

The present invention relates to soldering material, more particularly soldering material which is used for soldering parts which are used under environments where fatigue is likely to occur, and particularly for soldering electronic parts on a printed circuit substrate.

2. Description of Related Arts

Generally, the basic components of soldering material are binary Sn-Pb. It is known that various components are added so as to improve the properties of the binary Sn-Pb alloy.

Japanese Examined Patent Publication No. 40-25885 discloses the fact that copper, silver, nickel or the like have been added to the soldering material in order to prevent the copper of an electric soldering-iron from dissolving into the soldering material, and thus damaging it. It is described therein that damage is prevented through the function of silver or nickel which leads to the uniform dispersion of copper.

Japanese Examined Patent Publication No. 45-2093 discloses the fact that corrosion-resistance of solder with aluminum alloy at the soldered part is improved by addition of Ag or Sb, and, further, fluidity and ease of the soldering operation are improved by addition of Cd.

The following is a prior art which intends to improve specifically the soldering materials used for integrated circuits and printing substrates.

Japanese Examined Patent Publication No. 52-20377 discloses concurrent addition of Cu and Ag, in order to prevent a thin copper-wire which is to be soldered, from being dissolved and eroded by solder, thereby incurring a strength-reduction. According to the description, Cu suppresses the soldering material from encroaching on the material to be soldered. However Cu, when added, raises the melting point of the soldering material, with the result that the melting of the material to be soldered is likely to occur. The liability of melting can be prevented by Ag which has the effect of lowering the melting point.

Japanese Unexamined Patent Publication No. 56-144893 aims to eliminate the drawback that the silver in a silver lead-wire of a ceramic capacitor, diffuses into the soldering material, thereby deteriorating the characteristics of the capacitor or peeling the silver surface. The above mentioned publications also aims to enable high-speed soldering and proposes Sn-Sb-Ag-Pb soldering material.

Japanese Unexamined Patent Publication No. 59-70490 proposes a 1–15% Sb–1–65% Sn(In)-Pb component and a Sb-Ag-Sn(In)-Pb component.

Regarding the properties of soldering material used for soldering electronic parts moved on an integrated circuit or a printed circuit, recently, attention is paid to the failure in current conduction which occurs because cracks are generated in the solder which bonds a lead-wire to a rand of a printed substrate. Presumably, the reason is as follows: stress is generated in a substrate and mounted electronic parts due to periodic change in the temperature in which they are used; the bonding member, i.e., the solder, undergoes this stress and is hence exposed constantly to stress; therefore, fatigue fracture occurs after long time use. In addition, the following facts seem to be reasons for accelerating the fatigue fracture: temperature rises at the soldered parts due to current conduction; heat generation occurs in the electronic parts; and, a printed circuit is subjected to mechanical vibration.

It has been clarified that the binary Sn-Pb soldering material consisting of the basic components involves a problem in fatigue resistance when it is used in an environment where it is exposed to thermal and mechanical stress for long period of time. Although fatigue resistance has heretofore been extensively studied with regard to materials and welded sections of aluminum and steel, methods for improving fatigue resistance of soldering material having not yet been clarified.

SUMMARY OF THE INVENTION

It is an object of the present invention to provide a soldering material having improved fatigue resistance.

It is a specific object of the present invention to provide a printed-circuit substrate, such as used in an automobile, in which a lead wire is soldered thereto, and the solder does not crack even under exposure for a long period of time to a severe environment, such as a temperature variation from minus several tens °C. to plus a hundred and several tens °C., mechanical vibration imparted to the substrate.

In accordance with the objects of the present invention, there is provided a soldering material which essentially consists, by weight %, of from 20 to 50% of Pb, from 0.05 to less than 1% of Sb, from 0.1 to 5% of In, and balance of Sn. To this composition, from 0.05 to 5% of Ag and/or 0.05 to 2% of Cu may occasionally be added.

The compositional range of from 20 to 50% of Pb, the balance of Sn being according to the present invention, almost corresponds to the binary Sn-Pb eutectic composition, in which soldering is possible at low temperatures. With Sb and In contents less than 0.05% and 0.1%, respectively, the fatigue resistance cannot be improved by Sb and In. On the other hand, when the Sb content exceeds 1%, the fatigue resistance tends to be lowered. When the In content exceeds 5%, the fatigue resistance tends to be lowered. A preferable Sn-Pb-Sb-In composition is from 25 to 45% of Pb, from 0.3 to 0.9% of Sb, from 0.3 to 5% of In, and balance Sn. More preferable composition is from 30 to 45% of Pb, from 0.5 to 0.9% of Sb, from 0.5 to 3% of In, and balance Sn. Furthermore preferable contents of Pb and In are from 40 to 45% and from 0.5 to 2%, respectively. The content of Pb may be from 35 to 45%. Ag and Cu added to the Sn-Pb-Sb-In composition further improve the fatigue resistance. When the Ag and Cu contents exceed 5% and 2%, respectively, the fatigue resistance is impaired by Ag and the soldering property is impaired by Cu. Preferred contents of Ag and Cu are 0.1% or more. More preferred content of Ag is from 0.5 to 3%, and more preferred content of Cu is 0.3% or less in the light of soldering property. However, a preferable Cu content in the light of fatigue resistance is from 0.3 to 1.0%.

The influence of the above additive elements upon the binary Sn-Pb alloy are described in more detail with reference to the experiments by the present inventors.

Tensile and fatigue tests were carried out in order to investigate relationships between static strength, toughness and fatigue resistance with regard to the binary 40% Pb-Sn (balance) alloy.

TABLE 1

| Alloy Nos. | Ag | Cu | In | Sb | Remarks |
|---|---|---|---|---|---|
| 1 | — | — | — | — | Comparative Material |
| 2 | 1 | — | — | — | Comparative Material |
| 3 | — | — | 1 | — | Comparative Material |
| 4 | — | — | 1 | 0.5 | Inventive Material |
| 5 | 1 | 1 | 1 | 0.5 | Inventive Material |
| 6 | 1 | — | 1 | 0.5 | Inventive Material |

DESCRIPTION OF PREFERRED EMBODIMENTS

Figure 2:
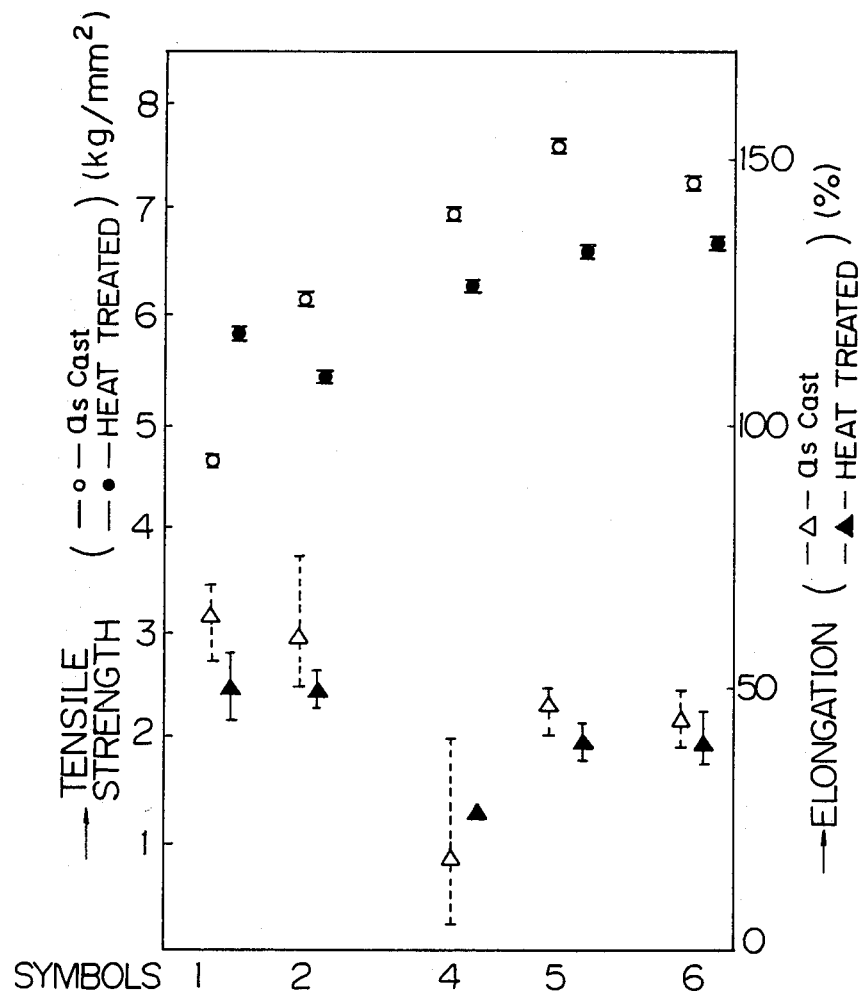
FIG. 2 is a graph illustrating the relationship between the tensile strength and elongation.

The alloys in an as-cast state and heat-treated state at 160 °C.×110 hours were machined to form the tensile-test specimens. The tensile tests were carried out at a tensile speed of 5 mm/min. The results are shown in FIG. 2.

Figure 3:
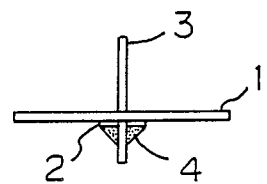
FIG. 3 is a drawing of a test specimen subjected to a fatigue resistance test.

The fatigue test was carried out using the specimen shown in FIG. 3. In the specimen, a lead wire 3 protrudes through the rand 2 made of a copper foil which is attached onto one surface of the phenol resin substrate 1, and the lead wire 3 is soldered (4) to the rand 2.

Figure 4:
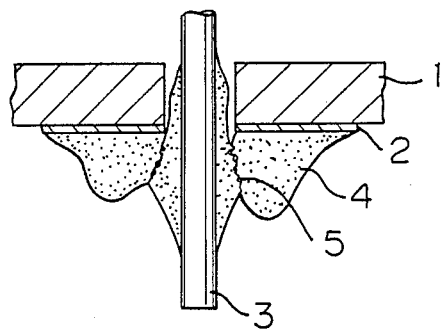
FIG. 4 is a drawing of a test specimen, in which a crack was generated in the fatigue-resistance test.

The testing method employed for obtaining the fatigue test was the followings; a tensile load was applied to the lead wire 3 at an oscilation frequency of 20 Hz (oscilation at one side) and temperature of 80° C. (constant). The crack was generated, as is indicated by 5 in FIG. 4, in the solder 4.

Figure 1:
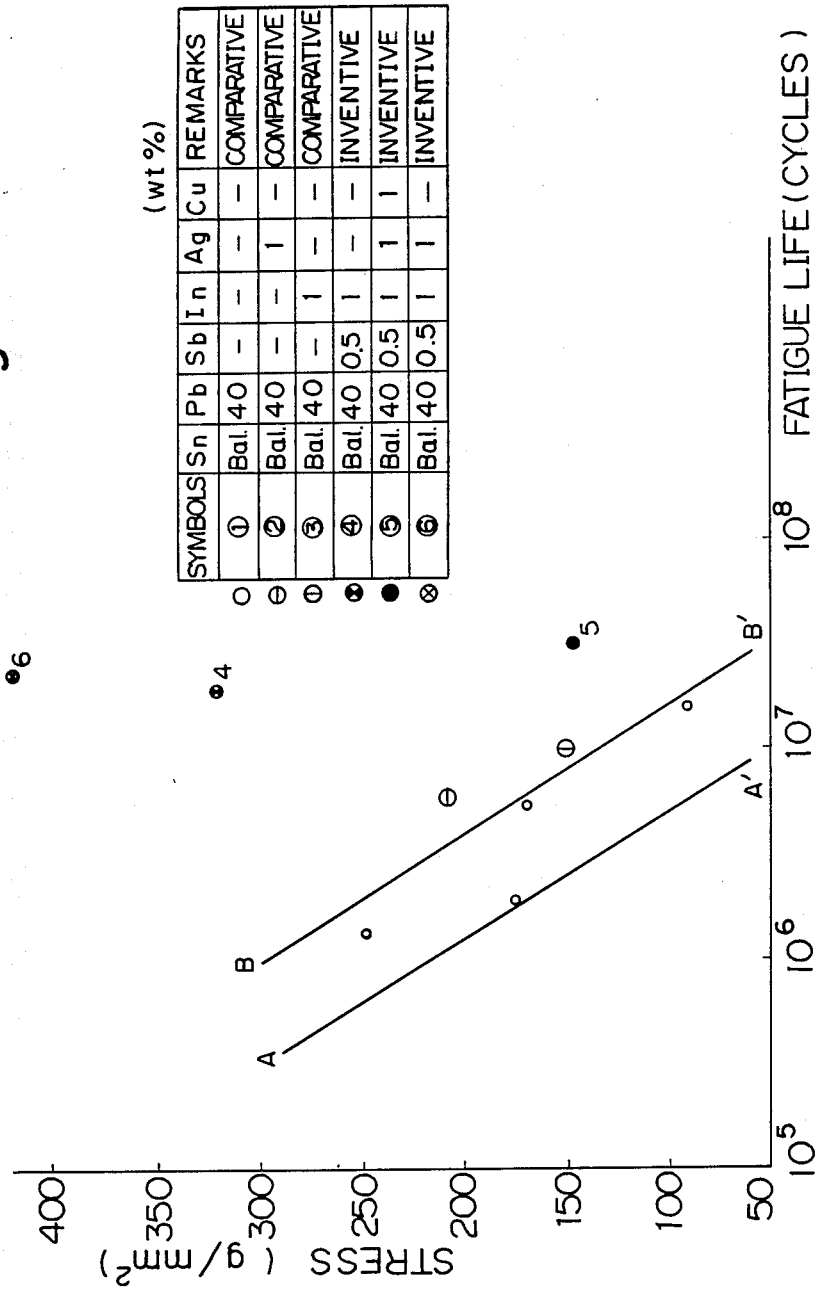
FIG. 1 is a graph illustrating the relationship between the fatigue life and shear stress.

Referring to FIG. 1 showing the fatigue life, the fatigue life of binary Sn-Pb soldering material lies between the line AA' and the line BB'. As compared with such fatigue life, the consecutive Sb and In addition drastically improves the fatigue life.

The relationship between static mechanical strength (FIG. 2) and fatigue life (FIG. 1) is next considered. There is an appreciable tendency for soldering materials having high tensile strength (4, 5, 6) to have a high fatigue resistance. On the other hand, since the soldering material (4) whose elongation is particularly low, has an excellent fatigue resistance, the relationship between elongation and fatigue resistance seems to be slight.

Several supplemental tests were carried out in order to explain the above experimental results by more metallurgical aspects.

Figure 5:
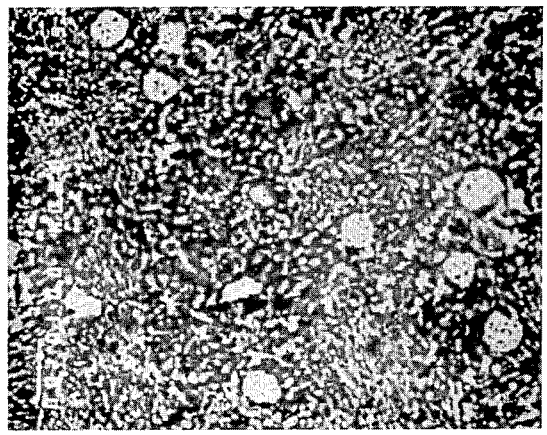
FIG. 5 is a photograph showing the microscopic structure of soldering material according to the present invention.

Referring to the microscopic structure (FIG. 5, magnification-1000 times) of the soldering material (alloy No. 5) which belongs to the inventive Pb-Sn-Sb-In alloy composition, the white parts are lead particles. Coarse lead particles are primary Pb and fine lead particles are eutectic Pb.

Investigation of the distribution of Sb and In by EPMA revealed that: Sb and In are relatively preferentially solid-dissolved in the Sn particles; and, Sb and In are not segregated locally either in the form of precipitates or crystals consisting of or mainly composed of Sb or In.

Investigation for the distribution of Ag, which is an optional additive according to the present invention, by EPMA, revealed that Ag is relatively abundant in the Sn matrix and is distributed at a high concentration in a network form.

Sb and In were added in greater amounts than the upper limits according to the present invention, in order to investigate the relationship between the alloy composition, microscopic structure and fatigue resistance. The results were that: the tensile strength is increased; the elongation was decreased; angular intermetallic compounds were formed, and, the fatigue resistance was inferior to that of a Sn-Pb alloy.

Based on the above and supplemental experiments it can be considered that strengthening, i.e., increase in the tensile strength, due to the consecutive addition of Sb and In, is a basis for improving the fatigue resistance. Decrease in elongation, which occurs due to the addition of Sb and In, generally leads to lowering the fatigue resistance. However, low elongation is not detrimental at all as long as that deformation of solder is within the elastic limits of the solder. This is understood for the condition of use of electronic parts. Angular precipitates or crystals, which are formed at the addition of great amounts of Sb and In, presumably behave as notches to shorten the fatigue life. When either Sb or In is added alone, it is possible to obtain the same tensile strength as in the inventive case of consecutive addition, provided that the amount of Sb or In added is relatively greater than the consecutive additional amounts. However, precipitates or crystals are formed as a result of addition in a great amount, and, hence, the desired fatigue resistance cannot be obtained. When Sb and In are consecutively added, the desired tensile strength is obtained by a relatively small amount of Sb and In. Sb and In are preferentially solid-dissolved in the Sn matrix, and, presumably, strengthen the structure as a whole by such solution-strengthening.

Heat treatment can improve the static mechanical properties and hence, fatigue resistance. It is however practically impossible to heat treat only the solder of a printed-circuit substrate, on which the electronic parts are mounted, because the electronic parts may be thermally influenced.

The present invention is hereinafter described by way of examples.

EXAMPLE

The fatigue-resistance test was carried out under the same conditions as described with reference to FIG. 1 except that the load was constant at 300 g/mm$^2$. The composition and fatigue life (cycles) are shown in Table 2.

TABLE 2

| | Samples | Composition (%) | | | | | | Fatigue Life |
|---|---|---|---|---|---|---|---|---|
| | | Sn | Pb | Sb | In | Ag | Cu | |
| Inventive | 1 | bal | 35 | 0.8 | 2 | — | — | $1.8 \times 10^7$ |
| | 2 | bal | 37 | 0.5 | 4 | — | — | $1.9 \times 10^7$ |
| | 3 | bal | 40 | 0.05 | 1 | — | — | $2.3 \times 10^6$ |
| | 4 | bal | 40 | 0.5 | 0.1 | — | — | $6.8 \times 10^6$ |
| | 5 | bal | 40 | 0.5 | 1 | — | — | $1.7 \times 10^7$ |
| | 6 | bal | 40 | 0.5 | 5 | — | — | $1.9 \times 10^7$ |
| | 7 | bal | 40 | 0.9 | 1 | — | — | $1.5 \times 10^7$ |
| | 8 | bal | 45 | 0.9 | 0.5 | — | — | $1.1 \times 10^7$ |
| | 9 | bal | 47 | 0.1 | 1.5 | — | — | $7.2 \times 10^6$ |
| | 10 | bal | 50 | 0.3 | 3 | — | — | $8.3 \times 10^6$ |

TABLE 2-continued

|  | Samples | Composition (%) | | | | | | Fatigue Life |
| --- | --- | --- | --- | --- | --- | --- | --- | --- |
|  |  | Sn | Pb | Sb | In | Ag | Cu |  |
|  | 11 | bal | 35 | 0.07 | 0.5 | 0.5 | 0.5 | $1.8 \times 10^7$ |
|  | 12 | bal | 38 | 0.1 | 2 | — | 1.5 | $8.5 \times 10^6$ |
|  | 13 | bal | 40 | 0.05 | 1 | 0.05 | — | $5.5 \times 10^6$ |
|  | 14 | bal | 40 | 0.5 | 0.1 | 1 | — | $1.3 \times 10^7$ |
|  | 15 | bal | 40 | 0.5 | 1 | 1 | 1 | $3.5 \times 10^7$ |
|  | 16 | bal | 40 | 0.5 | 1 | 1 | — | $2.9 \times 10^7$ |
|  | 17 | bal | 40 | 0.5 | 1 | — | 2 | $2.7 \times 10^7$ |
|  | 18 | bal | 40 | 0.5 | 1 | — | 1 | $2.6 \times 10^7$ |
|  | 19 | bal | 40 | 0.5 | 5 | 1 | — | $3.3 \times 10^7$ |
|  | 20 | bal | 40 | 0.5 | 1 | 3 | — | $3.0 \times 10^7$ |
|  | 21 | bal | 40 | 0.9 | 1 | 1 | — | $3.1 \times 10^7$ |
|  | 22 | bal | 42 | 0.15 | 3 | 0.5 | — | $1.4 \times 10^7$ |
|  | 23 | bal | 45 | 0.2 | 0.8 | 2 | — | $1.5 \times 10^7$ |
|  | 24 | bal | 49 | 0.9 | 2 | — | 0.1 | $9.5 \times 10^6$ |
|  | 25 | bal | 50 | 0.6 | 1.5 | 1.5 | — | $7.6 \times 10^6$ |
|  | 26 | bal | 25 | 0.9 | 1 | — | — | $9.7 \times 10^6$ |
|  | 27 | bal | 30 | 0.9 | 1 | — | — | $1.2 \times 10^7$ |
|  | 28 | bal | 35 | 0.9 | 1 | — | — | $1.4 \times 10^7$ |
| Comparative | 29 | bal | 40 | — | — | — | — | $1.0 \times 10^6$ |
|  | 30 | bal | 40 | 0.5 | — | — | — | $1.3 \times 10^6$ |
|  | 31 | bal | 40 | 0.5 | — | 1 | — | $1.8 \times 10^6$ |

The fatigue life of the Sn-40% Pb based, inventive solder materials is at least 2.3 times (with regard to No. 3) and as high as 33 times (with regard to No. 19) that of the comparative material No. 29 which is binary Sn-40% Pb soldering material.

We claim:

1. A solder having an improved fatigue resistance, which essentially consists, by weight %, of from 20 to 50% of Pb, from 0.05 to less than 1% of Sb, from 0.1 to 5% of In, and balance of Sn.

2. A solder according to claim 1, further containing at least one element selected from the group consisting of from 0.05 to 5% of Ag and 0.05 to 2% of Cu.

3. A solder according to claim 1 or 2, wherein the content of Pb is from 30 to 45%.

4. A solder according to claim 1 or 2, wherein the content of Sb is from 0.3 to 0.9%.

5. A solder according to claim 1 or 2, wherein the content of In is from 0.3 to 5%.

6. A solder according to claim 2, wherein the content of Ag is from 0.1 to 5%.

7. A solder according to claim 2, wherein the content of Cu is from 0.1 to 2%.

* * * * *